(12) United States Patent
Hurley

(10) Patent No.: US 7,771,683 B2
(45) Date of Patent: Aug. 10, 2010

(54) AIR POLLUTION CONTROL

(75) Inventor: Peter J. Hurley, West Yorkshire (GB)

(73) Assignee: Solucorp Industries, Ltd., West Nyack, NY (US)

( * ) Notice: Subject to any disclaimer, the term of this patent is extended or adjusted under 35 U.S.C. 154(b) by 0 days.

(21) Appl. No.: 12/167,199

(22) Filed: Jul. 2, 2008

(65) Prior Publication Data
US 2009/0148368 A1    Jun. 11, 2009

Related U.S. Application Data

(63) Continuation of application No. 11/118,107, filed on Apr. 29, 2005, now Pat. No. 7,407,602.

(60) Provisional application No. 60/566,272, filed on Apr. 29, 2004, provisional application No. 60/646,263, filed on Jan. 24, 2005.

(51) Int. Cl.
*B01D 53/34* (2006.01)
*B01D 53/64* (2006.01)
(52) U.S. Cl. ....................................... 423/210
(58) Field of Classification Search ................. 423/210
See application file for complete search history.

(56) References Cited

U.S. PATENT DOCUMENTS

| | | | |
|---|---|---|---|
| 4,889,698 A | 12/1989 | Moller et al. | |
| 5,419,834 A | 5/1995 | Straten | |
| 5,672,323 A | 9/1997 | Bhat et al. | |
| 5,989,497 A | 11/1999 | Labonte | |
| 6,214,304 B1 | 4/2001 | Rosenthal et al. | |
| 6,375,909 B1 | 4/2002 | Dangtran et al. | |
| 6,444,183 B1 | 9/2002 | Mottot et al. | |
| 6,447,740 B1 | 9/2002 | Caldwell et al. | |
| 6,521,021 B1 | 2/2003 | Pennline et al. | |
| 6,699,440 B1 | 3/2004 | Vermeulen | |
| 6,719,828 B1 | 4/2004 | Lovell et al. | |
| 7,521,032 B2 * | 4/2009 | Honjo et al. | ................. 423/210 |

FOREIGN PATENT DOCUMENTS

DE    196 49 927 CI    1/1998

OTHER PUBLICATIONS

Licata et al; Technical Publication, Multi-Pollutant Emissions Control & Strategies, "Coal-Fired Power Plant Mercury Control by Injecting Sodium Tetrasulfide"; © Babcock Power Enviromental Inc. 2003, 11 Sheets.

(Continued)

*Primary Examiner*—Timothy C Vanoy
(74) *Attorney, Agent, or Firm*—Christie, Parker & Hale, LLP

(57) ABSTRACT

In a method of controlling air pollution, a combustion gas is passed through a slurry of an alkaline-earth metal sulfide and a redox buffer (e.g., a phosphate), preferably in combination with an alkaline-earth metal carbonate and/or hydroxide. A composition for removing a heavy metal from a combustion gas is also provided, as an aerosolized, aqueous dispersion or slurry of an alkaline-earth metal sulfide and a buffering agent. A solid residue of the air pollution control process is also described.

26 Claims, 2 Drawing Sheets

OTHER PUBLICATIONS

Chen, et al. "Mercury Removal from Combustion Flue Gas by Activated Carbon Injection: Mass Transfer Effects," Preprints of Papers, American Chemical Society, Division of Fuel Chemistry, vol. 41:1 (Mar. 1996) 442, 442.

"Try-Mer™ Crossflow Scrubbers" (2003).

Doyle et al., "Dry Scrubber 20 Years Later," Babcock & Wilcox Company, a McDermott company (1999).

Pavlish, et al. "Status Review of Mercury Control Options for Coal-Fired Power Plants," Fuel Processing Technology, vol. 82:2-3, (Aug. 2003), 89, abstract.

* cited by examiner

FLOW DIAGRAM

AIR POLLUTION CONTROL

CROSS-REFERENCE TO RELATED APPLICATIONS

This application is a continuation of application Ser. No. 11/118,107, filed Apr. 29, 2005, now U.S. Pat. No. 7,407,602, which claims priority of Provisional Application Nos. 60/566,272, filed Apr. 29, 2004, and 60/646,263, filed Jan. 24, 2005. The disclosures of all three applications are incorporated by reference herein as if set forth in their entirety.

FIELD OF THE INVENTION

The present invention is directed generally to air pollution control technology, and in particular to technology for reducing mercury and other pollutants from combustion gases.

BACKGROUND OF THE INVENTION

Combustion gases from incinerators, power plants, and coal-fired furnaces typically contain oxides of sulfur ($SO_x$), oxides of nitrogen ($NO_x$), and volatile heavy metals such as mercury. Typical mercury concentrations in coal are 0.05 to 0.25 mg/Kg. On combustion, the mercury is volatilized and carried in the combustion exhaust gases.

Mercury poses a serious problem for human beings and the environment. MSNBC.com recently reported that the Southeast United States alone could save up to $2 billion a year by reducing mercury pollution. Coal-burning electric power plants are the single biggest source of mercury emissions, accounting for 40 percent of the total. Coal-fired burners account for another 10 percent.

Prior efforts to control $SO_x$, $NO_x$, and mercury emissions have included the use of dispersions of calcium carbonate and active carbon as an injected spray administered to exhaust gases, and/or the passing of exhaust gases through a scrubbing tower to neutralize the $SO_x$ and $NO_x$ emissions and sorb the volatile mercury. Following the scrubbing procedure, solids carried in the exhaust can then be recovered by electrostatic precipitators prior to discharge of the gases to the atmosphere. A combination of scrubbing and electrostatic precipitators used to condense gas-bound dusts can typically remove 50-85% of the gas-borne mercury.

Other efforts to control mercury emissions have employed alkali metal sulfides, e.g. sodium polysulfide solution, and in particular sodium tetrasulfide solution. See, e.g., U.S. Pat. No. 6,214,304, and Babcock Power Environmental Inc. Technical Publication, "Multi-Pollutant Emissions Control & Strategies, Coal-Fired Power Plant Mercury Control by Injecting Sodium Tetrasulfide"; Licata A, Beittel R, Ake T, ICAC Forum, Nashville, Tenn. Oct. 14-15 2003. Mercury is converted to mercury sulfide, and the mercury sulfide is precipitated out via a dust separator. The process requires the alkali metal sulfide solution to be introduced into the flue gas accompanied by the simultaneous addition of heat. The process can be used in conjunction with the addition of oxidizing agents, e.g. chlorine-containing compounds, to the burning coal or coke, such that elemental mercury is converted into its oxidized form, enabling the reagent to react with it more readily. This process is disadvantageous in that it is temperature-critical and the use of oxidizing agents in coal feedstocks may increase corrosion within the system. Additionally, the process residues containing precipitated mercury sulfide, in its black or beta-crystalline form, can be readily oxidized, as mercury sulfide is not stabilized to pH- or redox-induced reactions, thereby rendering the mercury sulfide precipitate vulnerable to re-oxidation and resolubilization in water, with the potential for increased bioavailability.

SUMMARY OF THE INVENTION

The present invention addresses the problem of mercury—and indeed, other heavy metals—in combustion gases by providing an improved process for removing such pollutants, using readily obtainable reagents, techniques, and apparatuses, and which can be used with or in conventional combustion gas scrubbers, for example, flue gas desulfurization (FGD) scrubbers. According to a first aspect of the invention, a combustion gas is allowed to contact a mixture of an alkaline-earth metal sulfide and a buffering agent, preferably a one selected from the group consisting of phosphoric acid, salts of phosphoric acid, alkaline-earth metal-based pH buffers, and mixtures thereof. Advantageously, in one embodiment of the invention the buffering agent comprises both an alkaline-earth metal pH buffer (e.g., calcium carbonate) and a redox buffer (e.g., triple super phosphate) capable of stabilizing a mercury sulfide precipitate. The mixture of reagents can be formed as an aqueous dispersion or slurry and introduced as an aerosol into the combustion gas stream, preferably downstream of a particulate removal device, such as a fabric filter or electrostatic precipitator (ESP).

In a second aspect of the invention, a composition for removing mercury or other heavy metal(s) from a combustion gas is provided and comprises an aerosolized, aqueous dispersion or slurry of an alkaline-earth metal sulfide and a buffering agent, for example, an aerosolized, 20-50% w/w solids dispersion of an alkaline-earth metal sulfide and a buffering agent.

BRIEF DESCRIPTION OF THE DRAWINGS

The invention will become better understood when reference is made to the accompanying drawings, wherein.

DETAILED DESCRIPTION

Figure 1:
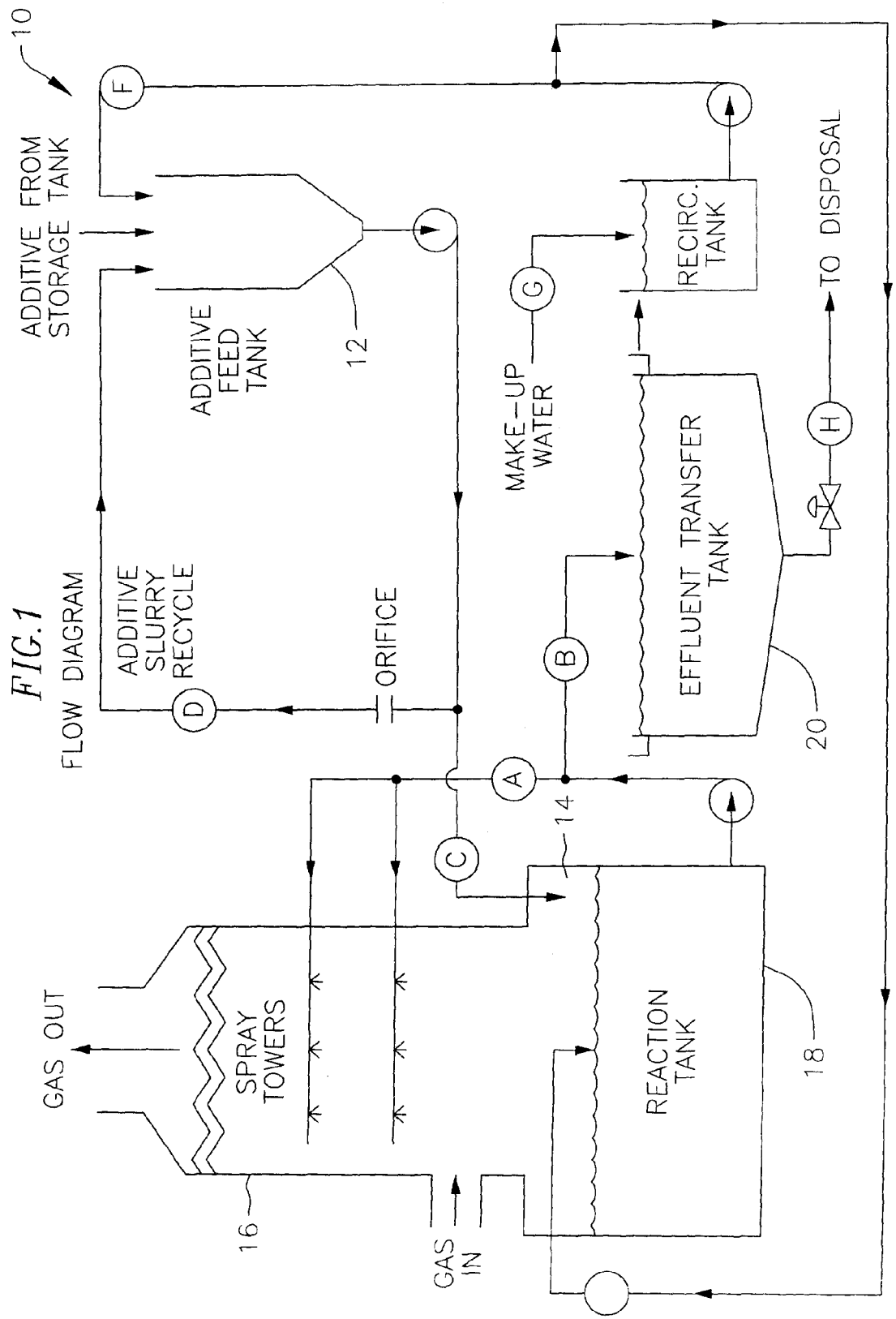
FIG. 1 is a schematic illustration of a wet scrubber for removing mercury from a combustion gas according to one embodiment of the present invention.

According to a first aspect of the invention, a method of controlling air pollution comprises allowing a combustion gas to contact a mixture of an alkaline-earth metal sulfide and a buffering agent. Preferably, the buffering agent is selected from the group consisting of phosphoric acid, salts of phosphoric acid, alkaline-earth metal-based pH buffers, and mixtures thereof. The alkaline-earth metal sulfide and a buffering agent (sometimes referred to collectively as a remediation agent) can be introduced as an aerosol into a combustion gas to react with and facilitate the removal of mercury and/or other heavy metals.

Nonlimiting examples of alkaline-earth metal sulfides include calcium sulfide, magnesium sulfides, adducts of calcium sulfide, adducts of magnesium sulfide, mixed calcium-magnesium sulfides, and mixtures thereof.

Nonlimiting examples of alkaline-earth metal-based pH buffers include calcium carbonate, calcium hydroxide, calcium phosphate, magnesium carbonate, magnesium hydroxide, magnesium phosphate, mixed calcium-magnesium carbonates, mixed calcium-magnesium hydroxides, mixed calcium-magnesium phosphates, triple superphosphate, apatite, and mixtures thereof. Triple superphosphate (also known as trisuperphosphate, TSP, and superphosphate) is predominately monocalcium phosphate hydrate ($CaH_2PO_4)_2.H_2O$) (CAS No. 65996-95-4)).

In a preferred embodiment, the buffering agent includes at least one redox buffer capable of stabilizing a mercury sulfide precipitate against subsequent redox reactions and/or dissolution in water (resolubilization). Nonlimiting examples of such redox buffers include phosphoric acid, salts of phosphoric acid, and mixtures thereof. More preferably, the buffering agent comprises at least one alkaline-earth metal-based compound and at least one redox buffer.

Alkaline-earth carbonates, hydroxides, phosphates, and like materials act as pH buffers within the acid gas stream, giving stability to the reagent mixture.

Phosphoric acid and/or its salts (e.g., phosphates) is employed as a redox buffer to ensure the stability of the final precipitated mercury sulfides. Additionally the phosphate may act as a moderate acid to oxidize any elemental mercury present in the combustion gas, such that it can be more easily precipitated by the alkaline-earth metal sulfide(s). Phosphates also have the benefit of being corrosion inhibitors. In contrast, calcium chloride agents currently employed as coal feedstock additives to facilitate elemental mercury oxidation can give rise to increased risk of plant corrosion.

Phosphates may function both as pH buffers and redox buffers.

A number of generic and more specific examples of the mixtures of reagents used in the practice of the invention are provided. In a generic embodiment, the mixture of reagents comprises an alkaline-earth metal sulfide and a buffering agent. In a slightly less generic embodiment, the mixture of reagents comprises an alkaline-earth metal sulfide, an alkaline-earth metal pH buffer, and a redox buffer. In a less generic embodiment, the mixture of reagents comprises an alkaline-earth metal sulfide, an alkaline-earth metal carbonate, and a phosphate. In a more specific embodiment, the buffering agent comprises triple superphosphate and at least one alkaline-earth metal carbonate or hydroxide (e.g., calcium carbonate, calcium hydroxide, and so forth). In another embodiment, the mixture of reagents comprises a mixture of calcium sulfide, triple superphosphate, and calcium carbonate. Even more specifically, in one embodiment of the invention, the mixture of reagents comprises calcium sulfide, triple superphosphate, and calcium carbonate, present in relative amounts of 3:1:2 by weight (w/w), respectively. Such a mixture is available from Solucorp Industries, Ltd. (West Nyack, N.Y.), as MBS 2.1™.

The mixture of reagents can be provided as an aqueous dispersion or slurry of finely divided particles in water, and can be administered (introduced to a combustion gas) as an aerosol or spray, or in some other convenient manner. Advantageously, the dispersion or slurry can, and preferably does, include a small amount (parts-per-thousand) of a dispersant, preferably a hyperdispersant, more preferably a polymeric hyperdispersant, such as the Solsperse Hyperdispersants® adducts from Noveon Specialty Additives, Noveon Division, Lubrizol Ltd., Blackley, Manchester M9 8ZS, United Kingdom. A specific example is SolPlus D540®, a polyethylene glycol nonionic surfactant. A solids dispersion can be prepared by bead milling.

The dispersion or slurry of reagents is provided at a concentration suitable for use in a particular air pollution control apparatus, or type of apparatus, such as a wet or dry scrubber. For example, where a wet FGD-type scrubber is to be utilized, the mixture of an alkaline-earth metal sulfide and a buffering agent can comprise a 20-50% w/w solids dispersion, and the dispersion can be injected from nozzles into a combustion gas stream. In a dry scrubber, lower concentration dispersions or slurries may be appropriate, for example, a 20% w/w slurry of alkaline-earth metal sulfide and buffering agent, applied via a rotary atomizer. For a dry scrubbing system, typical particle size (solids) is roughly <325 mesh (e.g., about 45 microns). For wet scrubbing systems, larger particles (<200 mesh, e.g., about 75 microns) are acceptable.

FIG. 1 illustrates one embodiment of a wet scrubber 10 suitable for use in a FGD process and in the practice of the present invention. A mixture of reagents comprising an alkaline-earth metal sulfide and a buffering agent resides in the additive feed tank 12, with or without additional ground lime and/or limestone. It is introduced into the sump 14 of the wet scrubber via valve C. The spray in the tower 16 is controlled via valve A, and is regulated to meet the up-flowing combustion gases, downstream of a particulate removal device, such as a fabric filter or electrostatic precipitator (ESP). The pH of the reaction tank 18 is maintained at approximately pH 6 to 8. The reaction is monitored for sulfide content, and when this falls below effective levels the reaction tank is drained to the effluent transfer tank 20 via valve B, and the slurry is dewatered (thickened). Drained water is recycled in the process. The concentrated slurry is transferred to a press-filter or rotary drum filter (not shown) via valve H, and the dried solid is packaged for sale or disposal. The reaction tank is recharged and the process recommences. A single scrubber can be operated in isolation or, more preferably, banks of three to six wet scrubbers are operated in parallel. They may be used in conjunction with existing gypsum production units or operated as a pre-treatment, upstream of a gypsum production unit or units.

Scrubbers for air pollution control are well known. A nonlimiting example of one such scrubber is the wet flue gas desulfurization (FGD) scrubber sold by Babcock and Wilcox (a subsidiary of McDermott International). The scrubber has a spray level for introducing reagents, and includes at least one nozzle, i.e., a slurry spray nozzle.

Figure 2:
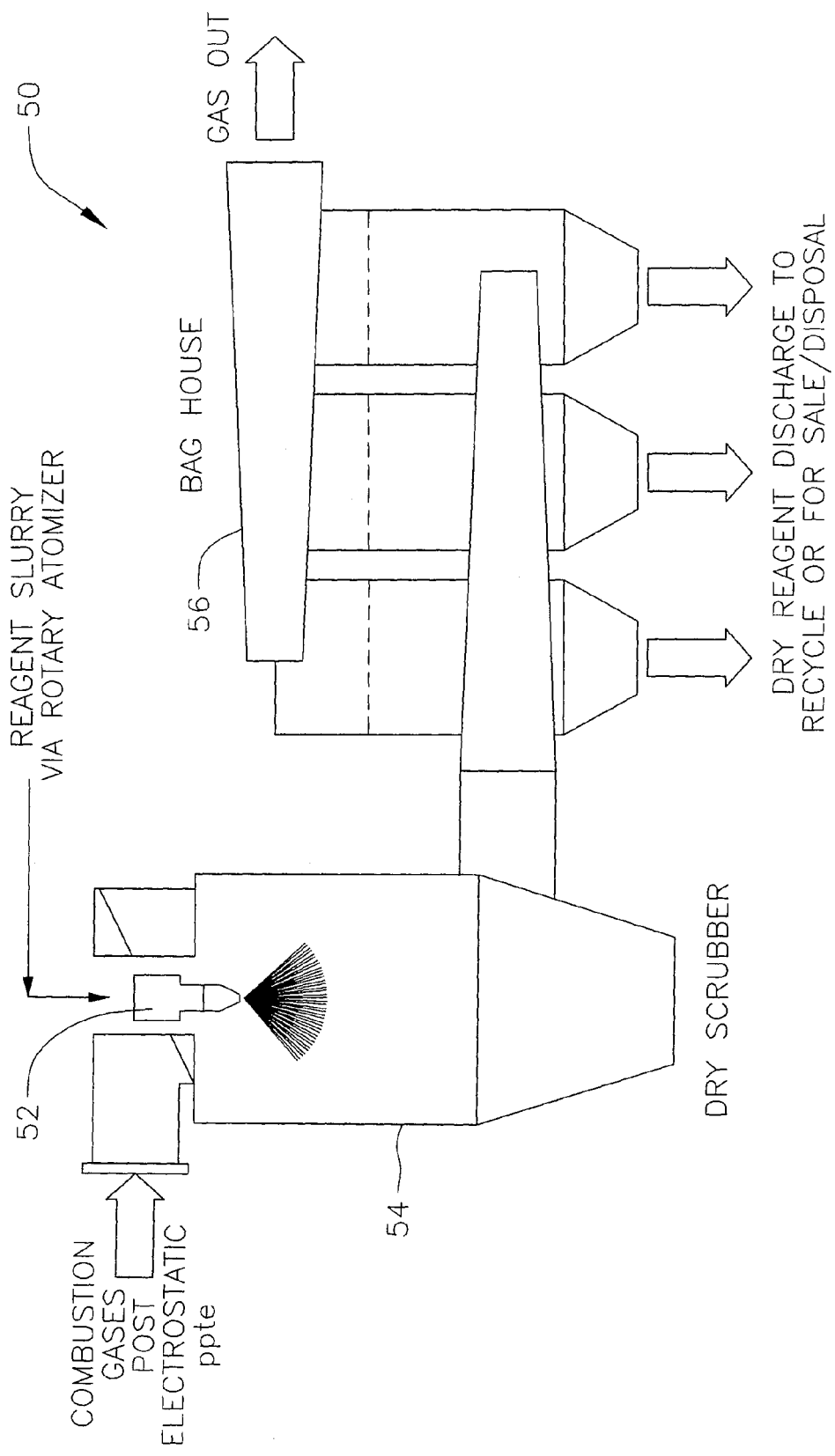
FIG. 2 is schematic illustration of a dry scrubber for removing mercury from a combustion gas according to one embodiment of the present invention.

FIG. 2 illustrates one embodiment of a dry scrubber 50 suitable for use in the practice of the invention. A mixture of reagents is introduced into the dry scrubber as a 20% w/w slurry via a rotary atomizer 52. The configuration for the scrubber 54 should be such as to maximize the wet contact time of the reagent aerosol with the combustion gases, yet permit the dried aerosol to pass into the bag house 56 in a dry form so as not to blind the bag house filtration system. The dried reaction product may be recovered for recycling or sale.

In both the wet scrubbing and dry scrubbing systems, mercury present in the combustion gas is converted to a solid mercury sulfide precipitate and thereby separated from the exhaust gas. While not bound by theory, it is believed that the present invention should facilitate greater than 95% recovery of mercury as the combustion gas transits the scrubber. Advantageously, the mercury-containing process residues are solid, substantially insoluble and, it is believed, stabilized against resolubilization, as the buffering agents act to retard redox reactions that could lead to oxidation and resolubilization.

It will be appreciated that, in addition to mercury, other heavy metals present in a combustion gas should be recoverable through the practice of the present invention. Most heavy metals form metal sulfide precipitates. These should be stabilized against subsequent oxidation and resolubilization as a consequence of exposure to phosphates or similar buffering agents present in the remediation agent, allowing lead and other heavy metals to be recovered in a water-stable form.

It will also be appreciated that the removal of mercury and other metals from a combustion gas according to the invention is compatible with existing air pollution control equipment and methods for removing $SO_x$ and $NO_x$ gases from combustion gas.

In addition to the air pollution control processes described above, the invention also provides a remediation agent for use with wet and dry scrubbers. According to this aspect of the invention, a composition for removing mercury or other heavy metal(s) from a combustion gas comprises an aerosolized, aqueous dispersion or slurry of an alkaline-earth metal sulfide and a buffering agent, where each of those terms is described above. In one embodiment, the aerosolized dispersion or slurry comprises a 20-50% w/w solids dispersion of alkaline-earth metal sulfide and a buffering agent. Aerosols are formed in a conventional manner using, e.g., a spray nozzle, rotary atomizer, or other suitable apparatus.

The air pollution control methods and compositions described herein have the advantages of not being temperature-critical and readily facilitating reaction with mercury and, indeed, other heavy metals in both their ionic and elemental forms, at room temperature. In contrast, basic agents that act by virtue of their alkalinity alone cannot react with and remove elemental mercury from vapor. Processes employing sodium sulfide are temperature-critical; their effectiveness requires the application of high temperatures.

The use of an alkaline-earth metal sulfide is significant. Essentially insoluble and solid in form, alkaline-earth metal sulfides are much less malodorous than alkali sulfides, thereby rendering them easier to handle, and they are less susceptible to the degradative oxidation that is experienced by alkali sulfides such as sodium polysulfide and sodium tetrasulfide.

The presence of alkaline-earth metal carbonates, hydroxides, and/or similar compounds within the remediation agent buffers the alkaline-earth metal sulfide from adverse oxidative interactions with acid compounds within the flue gas. Thus any unreacted alkaline-earth metal sulfide, which is not diluted by degradative oxidation residues, can be recycled, and the evolution of hydrogen sulfide gas is minimized.

Additionally the process residues are solid, insoluble and stabilized. (Cf. Molecular Bonding Systems SITE Report EPA/540/R-97/507, incorporated by reference herein.) They are maintained in this form with the assistance of a redox buffer, e.g. trisuperphosphate or calcium phosphate. Thus, an additional advantage and aspect of the present invention is that the by-products recovered from the scrubber and precipitators are in a stable and non-leachable form, such that they may be disposed of as non-hazardous waste or, alternatively, supplied as a non-hazardous raw material for the manufacture of construction products, such as gypsum board, cement, and cement blocks. Hence, the invention also provides a solid residue produced as a byproduct of the air pollution control methods described herein, including the specific permutations recited above.

In one embodiment, the residue is provided as a solid, substantially water insoluble, mercury-containing material, comprising an inorganic matrix containing mercury in a substantially nonleachable form, produced as a byproduct of an air pollution control process in which a mercury-containing combustion gas is allowed to contact a mixture of an alkaline-earth metal sulfide and a buffering agent. In contrast, the process residues from sodium polysulfide and sodium tetrasulfide scrubbing are not stabilized and are substantively soluble, in that they contain quantities of sulfates, sulfites and thiosulfates, thereby presenting a waste disposal problem.

The invention has been described in terms of various exemplary and preferred embodiments, but is not limited thereto. Various modifications can be made without departing from the invention, the scope of which is limited only by the appended claims and their equivalents. Throughout the claims, use of "an" and other singular articles is not intended to proscribe the use of plural components. Thus, more than one alkaline-earth metal sulfide, more than one alkaline-earth metal-based pH buffer, and so forth, may be utilized.

What is claimed:

1. A method for controlling air pollution, comprising: allowing a combustion gas to contact an aqueous, 20-50% w/w solids dispersion of an alkaline-earth metal sulfide and a buffering agent, wherein the buffering agent is selected from the group consisting of phosphoric acid, salts of phosphoric acid, alkaline-earth metal-based pH buffers, and mixtures thereof.

2. The method of claim 1, wherein the solids have an average particle size of 75 microns or less.

3. The method of claim 1, wherein the solids have an average particle size of 45 microns or less.

4. The method of claim 1, wherein the solids have an average particle size ranging from about 45 microns to about 75 microns.

5. The method of claim 1, wherein the alkaline-earth metal sulfide is selected from the group consisting of calcium sulfide, magnesium sulfide, adducts of calcium sulfide, adducts of magnesium sulfide, mixed calcium-magnesium sulfides, and mixtures thereof.

6. The method of claim 1, wherein the buffering agent includes at least one alkaline-earth metal-based pH buffer selected from the group consisting of calcium carbonate, calcium hydroxide, calcium phosphate, magnesium carbonate, magnesium hydroxide, magnesium phosphate, mixed calcium-magnesium carbonates, mixed calcium-magnesium hydroxides, mixed calcium-magnesium phosphates, triple super phosphate, apatite, and mixtures thereof.

7. The method of claim 1, wherein the buffering agent includes at least one redox buffer capable of stabilizing a mercury sulfide precipitate against water resolubilization.

8. The method of claim 7, wherein the at least one redox buffer comprises phosphoric acid or a salt of phosphoric acid.

9. The method of claim 1, wherein the buffering agent comprises triple super phosphate and at least one alkaline-earth metal carbonate or hydroxide.

10. The method of claim 1, wherein the aqueous mixture includes a hyperdispersant.

11. The method of claim 10, wherein the hyperdispersant is polymeric.

12. The method of claim 1, wherein the aqueous mixture of alkaline-earth metal sulfide and buffering agent comprises a mixture of calcium sulfide, triple super phosphate, and calcium carbonate.

13. The method of claim 12, wherein the calcium sulfide, triple super phosphate, and calcium carbonate are present in relative amounts of 3:1:2 by weight, respectively.

14. The method of claim 1, wherein the solids dispersion is prepared by bead milling.

15. The method of claim 1, wherein the combustion gas is generated in an incinerator or power plant.

16. The method of claim 1, wherein the combustion gas is generated by a coal-burning furnace.

17. A method for controlling air pollution, comprising forming an effluent containing at least one heavy metal sulfide by injecting an aqueous, 20-50% w/w solids dispersion into a combustion gas containing at least one heavy metal, the dispersion comprising an alkaline-earth metal sulfide and a buffering agent selected from the group consisting of phosphoric acid, salts of phosphoric acid, alkaline-earth metal-based pH buffers, and mixtures thereof; and collecting the effluent.

18. The method of claim 17, further comprising adjusting the pH of the effluent to a pH of about 6 to 8.

19. The method of claim 17, wherein the alkaline-earth metal sulfide comprises calcium sulfide, the alkaline-earth metal carbonate comprises calcium carbonate, and the phosphate comprises triple super phosphate.

20. The method of claim 17, wherein the alkaline-earth metal sulfide is selected from the group consisting of calcium sulfide, magnesium sulfide, adducts of calcium sulfide, adducts of magnesium sulfide, mixed calcium-magnesium sulfides, and mixtures thereof.

21. The method of claim 17, wherein the buffering agent includes at least one alkaline-earth metal-based pH buffer selected from the group consisting of calcium carbonate, calcium hydroxide, calcium phosphate, magnesium carbonate, magnesium hydroxide, magnesium phosphate, mixed calcium-magnesium carbonates, mixed calcium-magnesium hydroxides, mixed calcium-magnesium phosphates, triple super phosphate, apatite, and mixtures thereof.

22. The method of claim 17, wherein the buffering agent includes at least one redox buffer capable of stabilizing a mercury sulfide precipitate against water resolubilization.

23. The method of claim 22, wherein the at least one redox buffer capable of stabilizing a mercury sulfide precipitate against water resolubilization comprises phosphoric acid or a salt of phosphoric acid.

24. The method of claim 17, wherein the mixture of alkaline-earth metal sulfide and buffering agent are injected into the combustion gas through one or more spray nozzles.

25. The method of claim 17, further comprising dewatering the mixture in the effluent tank to obtain a drained water stream and a concentrated slurry; and filtering the concentrated slurry to obtain a solid residue.

26. The method of claim 25, wherein the solid residue is an inorganic matrix containing mercury in a substantially non-leachable form.

* * * * *